United States Patent
Lindskog et al.

(10) Patent No.: US 7,362,815 B2
(45) Date of Patent: *Apr. 22, 2008

(54) TIME-REVERSAL BLOCK TRANSMIT DIVERSITY SYSTEM FOR CHANNELS WITH INTERSYMBOL INTERFERENCE AND METHOD

(75) Inventors: Erik D. Lindskog, Sunnyvale, CA (US); Arogyaswami J. Paulraj, Stanford, CA (US)

(73) Assignee: Board of Trustees of the Leland Stanford Junior University, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/330,949

(22) Filed: Jan. 11, 2006

(65) Prior Publication Data

US 2006/0115031 A1 Jun. 1, 2006

Related U.S. Application Data

(63) Continuation of application No. 09/833,543, filed on Apr. 11, 2001.

(60) Provisional application No. 60/197,306, filed on Apr. 14, 2000.

(51) Int. Cl.
  *H04L 23/02* (2006.01)
  *H04L 5/12* (2006.01)
(52) U.S. Cl. .................... 375/264; 375/267; 375/299; 370/487
(58) Field of Classification Search ............... 375/346, 375/264, 284, 267, 299; 370/487, 490; 455/101
See application file for complete search history.

(56) References Cited

U.S. PATENT DOCUMENTS

| 4,733,402 A | | 3/1988 | Monson |
| 5,752,173 A | * | 5/1998 | Tsujimoto .................... 455/137 |

(Continued)

FOREIGN PATENT DOCUMENTS

EP  0 993 130 A2  7/1999

(Continued)

OTHER PUBLICATIONS

Alamouti, S., "A Simple Transmit Diversity Technique for Wireless Communications," *IEEE Journal*, vol. 16, No. 8, (Oct. 1998), pp. 1451-1458.
Ariyavisitakul, S., "A Decision Feedback Equalizer with Time-Reversal Structure," *IEEE Journal*, vol. 10, No. 3, (Apr. 1992), pp. 599-613.
Lindskog, E., et al., "A Transmit Diversity Scheme for Channels with Intersymbol Interference," *Department of Electrical Engineering, ISL*, Stanford University, pp. 307-311, Jun. 18-22, 2000.

(Continued)

*Primary Examiner*—Ted Wang
(74) *Attorney, Agent, or Firm*—Perkins Coie LLP

(57) ABSTRACT

A method for diversity transmission and reception for channels with intersymbol interference is created. With this method one can transmit from two or more antennas in such a way that a receiver with one or more antennas can benefit from the diversity offered by the difference in channels from the transmit antennas to the receiver antenna(s). The way the transmission and reception is organized makes it relatively simple to in the receiver detect the transmitted symbols despite intersymbol interference in the channel. Due to the increased diversity experienced by the receiver the average power level required at the receiver is reduced which can be used to increase the capacity or coverage of a wireless network and/or reduce the required transmitted power.

41 Claims, 3 Drawing Sheets

U.S. PATENT DOCUMENTS

| | | | |
|---|---|---|---|
| 6,128,351 A * | 10/2000 | Jones et al. | 375/284 |
| 6,185,258 B1 * | 2/2001 | Alamouti et al. | 375/260 |
| 6,211,815 B1 * | 4/2001 | Richey et al. | 342/194 |
| 6,301,291 B1 * | 10/2001 | Rouphael et al. | 375/150 |
| 6,594,226 B1 | 7/2003 | Benning et al. | |
| 6,697,641 B1 | 2/2004 | Shapira | |
| 6,748,024 B2 * | 6/2004 | Kuchi et al. | 375/299 |

FOREIGN PATENT DOCUMENTS

| | | |
|---|---|---|
| JP | 10-190614 | 7/1998 |
| JP | 10-190614 A | 7/1998 |
| WO | WO 99/14871 | 3/1999 |
| WO | WO 00/14921 | 3/2000 |
| WO | WO 01/80446 A3 | 10/2001 |

OTHER PUBLICATIONS

Lindskog, E., "Multi-Channel Maximum Likelihood Sequence Estimation," *IEEE*, 1997, pp. 715-719.

Viterbi, A.J., "Error Bounds for Convolutional Codes and an Asymptotically Optimum Decoding Algorithm," *IEEE Transactions on Information Theory*, vol. IT-13, No. 2, (Apr. 1967), pp. 260-269.

Wittneben, A., "Basestation modulation diversity for digital SIMULCAST," *IEEE*, 1991, pp. 848-853.

* cited by examiner

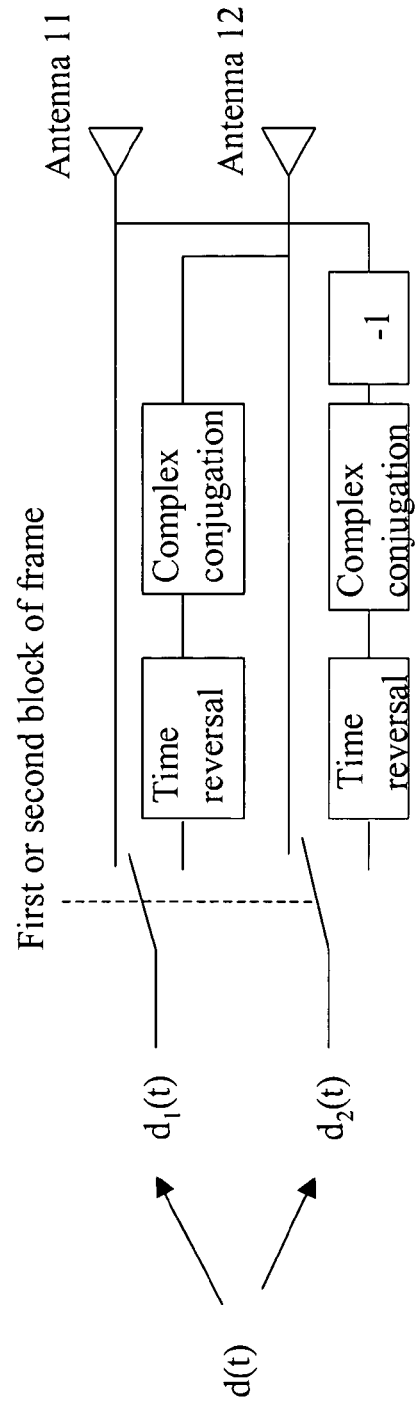

TIME-REVERSAL BLOCK TRANSMIT DIVERSITY SYSTEM FOR CHANNELS WITH INTERSYMBOL INTERFERENCE AND METHOD

RELATED APPLICATION

This application is a continuation application of pending U.S. Ser. No. 09/833,543, filed Apr. 11, 2001, which claims the benefit of U.S. Provisional Application No. 60/197,306 filed Apr. 14, 2000; each of which applications are hereby incorporated by reference.

FIELD OF THE INVENTION

The present invention relates, in general, to techniques that reduce the effects of fading in wireless communication systems, and more particularly to techniques which reduce the variation in signal strength of the received signal, while still effectively handling intersymbol interference.

BACKGROUND OF THE INVENTION

Sending a signal in the form of symbols transmitted at radio frequencies is one way of sending information. Several problems exist with this approach. A wireless communication channel typically experiences fading, i.e. the received signal strength varies with time and the position of the receiver and/or the transmitter. Further, a wireless communication channel often suffers from intersymbol interference, i.e. super-positioning of delayed versions of the transmitted symbol sequence. Intersymbol interference arises, for example, when a receiver picks up delayed versions of a single transmission. Buildings, mountains and other objects create delayed copies of a signal when a transmission reflects off the surface of the object and arrives at the receiver later than a version having fewer or no reflections before arriving at the receiver. The spread in time between the different copies of a signal is called the delay spread. The delay spread results in multiple overlaid copies of the signal with different amplitudes, phases and delays. The multiple copies interfere with the intended signal transmission, becoming noise and causing signal disruption.

Another problem with wireless communication is that the variation in signal strength at a receiver typically requires the system to be designed to transmit with higher power than would be necessary if the signal strength was constant, or if it varied less. This typically reduces the capacity of the system.

S. M. Alamouti (1, 2) proposes a method of overcoming this limitation. He provides a two-branch transmit diversity scheme in which two transmit antennas and one receive antenna provide the same diversity as can be achieved with one transmit antenna and two receive antennas. This means that the same reduction in the variation of the quality of the received signal that can be achieved with two receive antennas can instead be realized with two transmit antennas. In the case of a cellular wireless system with base stations and subscriber units, the variability on both the uplink and the downlink can be combated with only multiple antennas at the base station, rather than at the subscriber unit, where it is costly and cumbersome to have multiple antennas.

A problem with the S. M. Alamouti two-branch transmit diversity scheme is that it does not effectively handle intersymbol interference in the channel. When a channel suffers from intersymbol interference, multiple versions of the original symbol sequence are received with different delays making the detection of the symbol sequence more difficult. Intersymbol interference can be caused by multiple propagation paths with different delays or by the use of transmission pulse shaping that extends over more than one symbol interval, or by the receive filter. The transmission pulse shaping and the receive filter is considered to be part of the channel. When there is intersymbol interference in the channel, the S. M. Alamouti scheme loses some of its good properties. More specifically, because of the intersymbol interference in the channel the receiver cannot be realized in the simple form described by S. M. Alamouti. Instead a considerably more complex receiver is be required. This dramatically reduces the usefulness of the scheme for channels with intersymbol interference.

What is needed is a system and method of transmit diversity that enables a transmitter to provide a better signal with less power while still handling intersymbol interference effectively with a relatively simple receiver.

SUMMARY OF THE INVENTION

The invention overcomes the identified limitations and provides a system and method for transmit diversity in channels with intersymbol interference. We call the method time-reversal space-time block coding. The system and method reduces the variability of the quality of the signal received by the receiver with a relatively simple receiver algorithm, even for channels with intersymbol interference. Applying transmit delay diversity in two or more groups of antennas is another embodiment of the invention which further increases the number of channels used in the delay diversity scheme, and further reduces the variability in the quality of the received signal.

The invention relates to a method of reducing the variability in the signal level applicable to channels with intersymbol interference in a system for processing and transmitting a signal where the signal comprises a plurality of symbols. The system comprises a first and a second spaced antenna coupled to a transmitter. In one example, the method of reducing the variability in the signal level comprises the following steps. Divide the symbols of the signal into a first and a second symbol stream wherein the first and second symbol streams each have at least two symbols. Divide a transmission frame into a first and a second transmission block. Transmit the first symbol stream from the first antenna during the first transmission block and transmit the second symbol stream from the second antenna during the second transmission block. Time reverse, take the complex conjugate form of and negate the second symbol stream. Time reverse and take the complex conjugate form of the first symbol stream. Transmit from the first antenna during the second transmission block the second symbol stream in the time reversed, complex conjugate and negated form, and transmit from the second antenna the first symbol stream in the time reversed and complex conjugate form.

The invention, in another embodiment, relates to a method of transmitting a signal of the type comprising a sequence of symbols over spaced antennas, or antennas of different polarization, to reduce fading and intersymbol interference, comprising the steps of: (1) dividing the sequence of symbols into two sequences, (2) dividing the transmission frame into two blocks, (3) processing the symbols in said two sequences so that some of the symbols in at least one of the sequences are time reversed, some of the symbols in at least one of the sequences are complex conjugated, some of the symbols in at least one of the sequences are negated, and, (4) during one of the blocks of the transmission frame, applying one processed symbol sequence to a first antenna and the other processed signal sequence to a second antenna, and during the other block of the transmission frame applying the other processed symbol sequence to the first antenna and the one processed symbol sequence to the second antenna.

In a further embodiment, the invention relates to a method of receiving symbol sequences transmitted in transmission frames having two blocks over spaced antennas, or antennas with different polarization in which the symbol sequence which is transmitted is divided into two sequences, some of the symbols in at least one of the two sequences are time reversed, some are complex conjugated and some are negated and, during one of the blocks of the transmission frame, one processed symbol sequence is transmitted over the first antenna, and the other over the second antenna and, during the other block, the other symbol sequence is transmitted over the second antenna, and the one over the second antenna. Said receiver receiving the symbol streams in the first and second blocks of the transmission frames and time reversing and taking the complex conjugate form of the symbol stream in the second block and filtering the symbol stream in the first block and the time reversed complex conjugate of the symbol streams in the second block to form decoupled outputs.

The principles of this invention are also applicable to arrangements with more than one receive antenna. The multiple receive antennas can for example be used to combine the signal in order to improve the signal to noise ratio in the signal and suppress interference. The generalization of the receiver processing to more than one receiving antenna can be done with well known methods.

DESCRIPTION OF THE DRAWINGS

The foregoing and other objects of the present invention will be more clearly understood from the following description when read in connection with the accompanying drawings in which:

FIG. 3 illustrates the received signal after complex conjugation of $r'_2(t)$ in the transmit diversity scheme for channels without symbol interference.

FIG. 4 illustrates the received signal after manipulation in the transmit diversity scheme for channels with intersymbol interference.

FIG. 5 is a schematic view of the transmission in the transmit diversity scheme for channels with intersymbol interference.

GENERAL DESCRIPTION OF INVENTION

Figure 1:
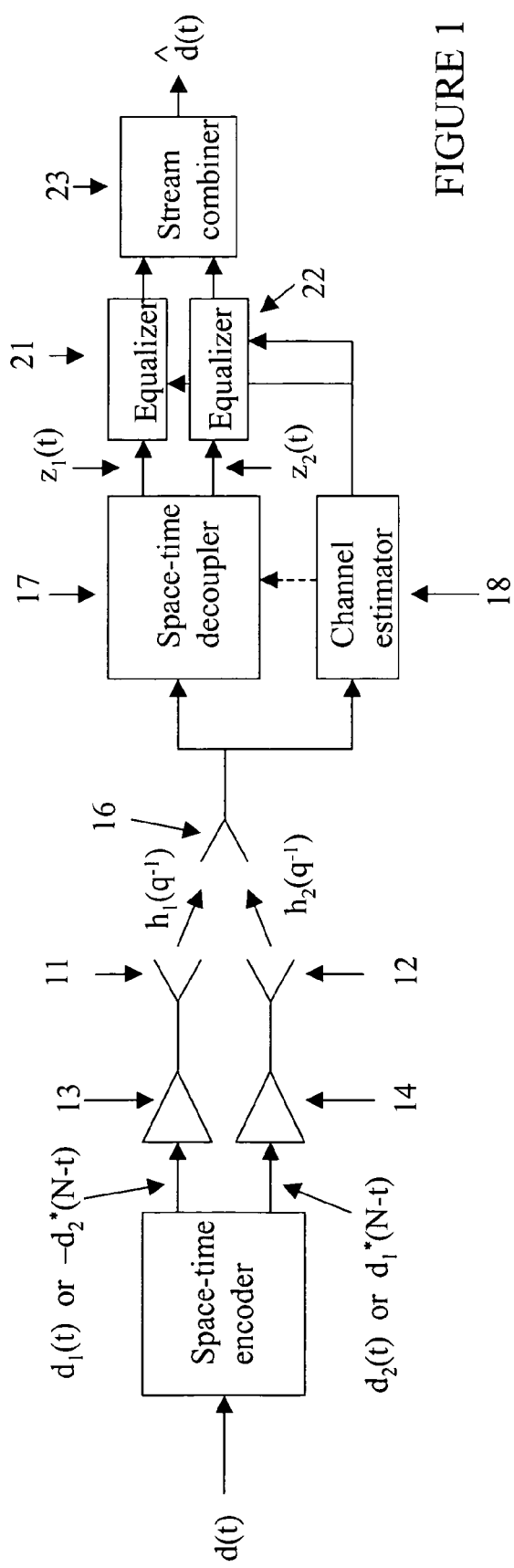
FIG. 1 is a schematic diagram of a time-reversal block transmit diversity system in accordance with the present invention.

The invention will be generally described with reference to FIG. 1. A symbol stream d(t) to be transmitted during a frame in the communication system is fed into a space-time encoder. The space-time encoder divides the symbol stream d(t) into two symbol streams, $d_1(t)$ and $d_2(t)$, each containing half the symbols. The transmission frame is also divided into two blocks. The space-time encoder provides input to two radio transmitters 13 and 14 connected to two antennas 11 and 12. In the transmitters 13 and 14, the digital signals from the space-time encoder are converted to analog signals via an analog-to-digital converter and upconverted to radio frequency. In one embodiment of the invention the space-time encoder transmits symbol stream $d_1(t)$ from antenna 11 during a first block of the transmission frame and transmits symbol stream $d_2(t)$ from the antenna 12. In a second block of the transmission frame, the space-time encoder transmits symbol stream $d_2(t)$ time-reversed, complex conjugated and negated from antenna 11 and symbol stream $d_1(t)$ is transmitted time-reversed and complex conjugated from antenna 12.

In the receiver, the signal is received by an antenna 16 and downconverted to baseband and digitized using well known methods. The digital signal is then fed into a space-time decoupler 17 and a channel estimator 18. Preferably some of the transmitted symbols are known. The channel estimator can then use the knowledge of these symbols value to estimate the channels between the two transmit antennas and the receiving antenna. These channel estimates are fed to the space-time decoupler which filters the received signal in such a way that two decoupled outputs, $z_1(t)$ and $z_2(t)$, are formed. These outputs are decoupled in the sense that $z_1(t)$ depends on $d_1(t)$ but not on $d_2(t)$ and $z_2(t)$ depends on $d_2(t)$ but not on $d_1(t)$. The signals $z_1(t)$ and $z_2(t)$ still suffer from intersymbol interference due to the delay spread in the propagation channel and/or partial response modulation in the transmitter and/or delay spread in the receive filter. However, since the signals $z_1(t)$ and $z_2(t)$ each only depend on one stream of symbols and not two, the estimation of the symbol streams $d_1(t)$ and $d_2(t)$ is much simpler than if $z$, (t) and $z_2(t)$ would depend on two symbols streams each. This is an important part of this invention. The equalization of the intersymbol interference in $z_1(t)$ and $z_2(t)$ to detect $d_1(t)$ and $d_2(t)$, respectively, can be performed with a maximum likelihood sequence estimator. Other equalizers or detectors that can be used are for example linear equalizers and decision feedback equalizers and different variations of all of these detectors. Detectors 21 and 22 can use the channel estimates from the channel estimator for the purpose of their tuning. After the symbol streams $d_1(t)$ and $d_2(t)$ have been detected they are combined at stream combiner 23 to form an estimate of the originally transmitted symbol stream, d(t).

It is possible to make simple modifications and enhancements to the method presented here without departing from the spirit of this invention. For example, it is possible to have different arrangements of the symbols in different number of streams and it is possible to divide a transmission frame into a different number of blocks, it is possible to apply the time-reversal, complex conjugation and negation in different fashions to these blocks while still achieving the same final goal, namely transmitting from multiple antennas in such a way that the receiver can recover the spatial diversity in a simple way even in the presence of intersymbol interference in the channel.

It is also possible to formulate the detection of the symbols differently in the receiver without departing from the spirit of the invention. For example, in the receiver, one will want to utilize the fact that with proper combining and filtering or arrangement of the computations, the detection of the symbol streams $d_1(t)$ and $d_2(t)$ effectively decouple into two separate detections of the symbol streams $d_1(t)$ and $d_2(t)$. In order to do this, the spirit of the invention must be utilized.

Another distinctive feature of this invention that can be realized, also with small modifications to how the transmission and reception is being performed, is the feature of transmitting in such a way and processing and filtering the received signal in such a way that multiple signal streams are produced, each of them effectively being a filtered version of a single symbol stream of symbol. This facilitates the mitigation of the intersymbol interference in the channel.

Another feature of this invention is how to signal over a channel such that the effective experienced channel is a time-reversed version of the actual channel. How this is performed is described in the detailed description of the invention. The ability to signal such that the time-reversed channel is experienced is important in order to handle intersymbol interference effectively when transmitting from multiple antennas to take advantage of diversity.

DETAILED DESCRIPTION OF THE INVENTION

Throughout this description, we will consider discrete-time channel models and detectors. A discrete-time filter will be represented as a polynomial in the unit delay operator, $q^{-1}$, as exemplified below:

$$v(t) = a(q^{-1})u(t)$$
$$= (a_0 + a_1 q^{-1} + \ldots + a_{na} q^{-na})u(t)$$
$$= a_0 u(t) + a_1 u(t-1) + \ldots + a_{na} u(t-na),$$

where na is the order of the polynomial $a(q^{-1})$, representing a filter with na+1 taps. The discrete time is denoted with the discrete variable t. Note that filters may also be non-causal and have terms with powers of the unit advance operator q.

Multiple-input-single-output (MISO) filters will be represented as polynomial row vectors, and single-input-multiple-output (SIMO) filters will be represented as polynomial column vectors. Multiple-input-multiple-output (MIMO) filters will be represented as polynomial matrices.

The complex conjugate of a filter $a(q^{-1})$ is defined as $$(a(q^{-1}))^* \triangleq a^*(q) = a^*_0 + a^*_1 q + \ldots + a^*_{na} q^{na} \tag{1}$$

Note that the resulting filter is anti-causal.

Correspondingly, the complex conjugate transpose of a MISO, SIMO or MIMO filter is the transpose of the filter with all filter elements complex conjugated according to (1).

Figure 2:
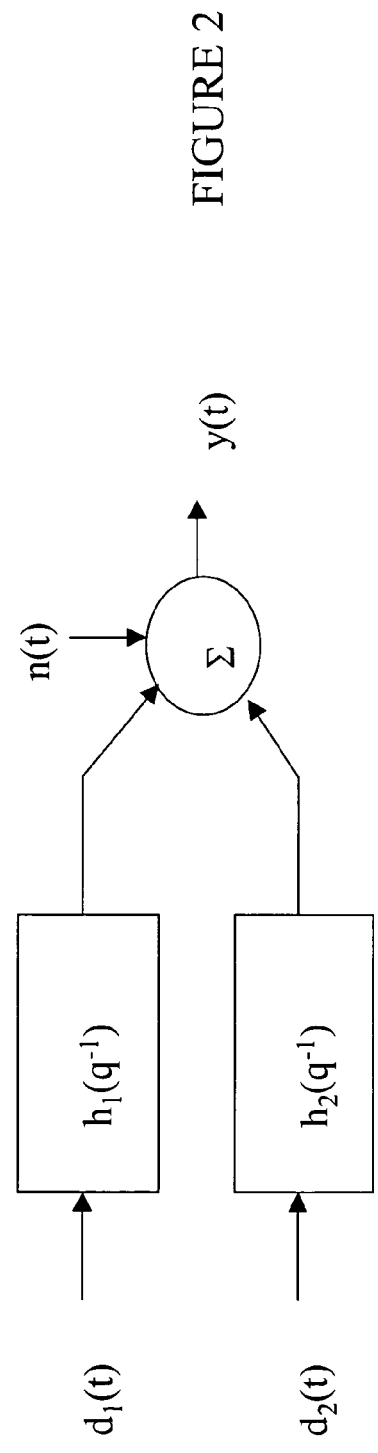
FIG. 2 is a channel model for two transmit antennas and a receive antenna.

The discrete-time model of a channel with two transmit antennas and one receive antenna is given by $$y(t) = h_1(q^{-1})d_1(t) + h_2(q^{-1})d_2(t) + n(t) \tag{2}$$
$$= (h_{1,0} + \ldots + h_{1,nh_1 - 1}q^{-nh_1 + 1})d_1(t) +$$
$$(h_{2,0} + \ldots + h_{2,nh_2 - 1}q^{-nh_2 + 1})d_2(t) + n(t),$$

where (2), y(t) is the received signal, $d_1(t)$ and $d_2(t)$ are the symbol sequences transmitted from antenna 11 and antenna 12 respectively, and $h_1(q^{-1})$ and $h_2(q^{-1})$ are the channels for antenna 11 and antenna 12 respectively. The additive noise is modeled by n(t). We will in this description assume that the noise is white with variance $\sigma_n^2$. See FIG. 2. The channel is assumed to be fading but to be approximately stationary over a block of symbols. Note that the pulse shape used in the modulation and the receive filter is part of the overall channel modeled in (2).

The invention here is described in terms of complex baseband processing in digital form. It is assumed that there are digital-to-analog converters that convert the digital baseband signals to be transmitted into analog signals that in turn are upconverted to radio frequency with radios using well known methods. These radio signals are then transmitted from antennas over the radio channel. Correspondingly it is assumed that the radio signals are received by antenna(s) and downconverted with radios using well known methods to an analog signals at baseband. This signal is then sampled and converted into a complex digital baseband signals using analog-to-digital converters.

A. Channel Without Intersymbol Interference

Let us for a moment assume that the channel has no delay spread and that we do not use partial response modulation. Thus, without any intersymbol interference the channels have only a single tap each, i.e.

$$h_1(q^{-1}) = h_1 \text{ and } h_2(q^{-1}) = h_2 \tag{3}$$

In the scheme presented by Alamouti in [1, 2], the original symbol stream, d(t), is divided into two separate symbol streams, $d_1(t)$ and $d_2(t)$. These two symbol streams are then transmitted on antenna 11 and antenna 12 such that every "even" sample the signal, $$r_1(t) = h_1 d_1(t) + h_2 d_2(t) + n_1(t) \tag{4}$$

is received. That is, $d_1(t)$ is transmitted from antenna 11 and $d_2(t)$ is transmitted from antenna 12. The noise $n_1(t)$ represents the corresponding even noise samples. Every "odd" sample the symbol streams are transmitted such that the signal, $$r'_2(t) = h_2 d^*_1(t) - h_1 d^*_2(t) + n'_2(t) \tag{5}$$

is received at the receiver. That is, $d^*_1(t)$ is transmitted from antenna 12 and $-d^*_2(t)$ is transmitted from antenna 11. The noise $n'_2(t)$ represents the corresponding odd noise samples. The received odd signal samples are then complex conjugated giving the signal $$r_2(t) = (r'_2(t))^* = h^*_2 d_1(t) - h^*_1 d_2(t) + n_2(t) \tag{6}$$

If we introduce the vectors $$r = \begin{bmatrix} r_1(t) \\ r_2(t) \end{bmatrix}, d(t) \begin{bmatrix} d_1(t) \\ d_2(t) \end{bmatrix}, \tag{7}$$

$$n(t) = \begin{bmatrix} n_1(t) \\ n_2(t) \end{bmatrix} = \begin{bmatrix} n_1(t) \\ (n'_2(t))^* \end{bmatrix} \tag{8}$$

and the matrix $$H = \begin{bmatrix} h_1 & h_2 \\ h^*_2 & -h^*_1 \end{bmatrix}, \tag{9}$$

we can express the transmission from the two symbol streams $d_1(t)$ and $d_2(t)$ to the received sequences $r_1(t)$ and $r_2(t)$ as $$r(t) = Hd + n(t) \tag{10}$$

Note that the "channel matrix" H is orthogonal such that $$H^H H = (|h_1|^2 + |h_2|^2)I \tag{11}$$

In [1, 2], Alamouti proposes to multiply r(t) with $H^H$ in the receiver to obtain the signal $$z(t) = H^H r(t) = H^H H d(t) + H^H n(t) \qquad (12)$$
$$= (|h_1|^2 + |h_2|^2)d(t) + v(t),$$

where $$v(t) = \begin{bmatrix} v_1(t) \\ v_2(t) \end{bmatrix} = H^H n(t). \qquad (13)$$

Note that $H^H$ is in fact the matched filter and that $z(t)$ in (12) is the matched filter output.

Using the components of $z(t)=[z_1(t) z_2(t)]^T$, we can express (12) as $$z_1(t)=(|h_1|^2+|h_2|^2)d_1(t)+v_1(t) \qquad (14)$$

$$z_2(t)=(|h_1|^2+|h_2|^2)d_2(t)+v_2(t) \qquad (15)$$

Using (11), we can compute the covariance of the noise vector $v(t)=[v_1(t)\ v_2(t)]^T$ as $$R_{vv} = E[v(t)v^H(t)] \qquad (16)$$
$$= H^H R_{nn} H$$
$$= \sigma_n^2 H^H H = \sigma_n^2(|h_1|^2 + |h_2|^2)I,$$

In the third equality we have used the fact that n(t) is a white vector noise sequence with the covariance $R_{nn}=\sigma_n^2 I$. Since $R_{vv}$ is diagonal, $v_1(t)$ and $v_2(t)$ are uncorrelated.

The matched filter outputs, $z_1(t)$ and $z_2(t)$, can obviously after proper scaling and slicing be used independently to estimate the transmitted symbols $d_1(t)$ and $d_2(t)$ respectively. The reason for this simplified decoupled detection is of course that the channel matrix H is orthogonal and thus $H^H H$ is diagonal. The detection of the two symbol streams, $d_1(t)$ and $d_2(t)$, thus decouples making the detection very easy. Further, since $v_1(t)$ and $v_2(t)$ are uncorrelated, no gain can be achieved by joint detection of the two symbol streams.

If we had one transmit antenna and two receive antennas the corresponding matched filter output would be $$z(t)=(|h_1|^2+|h_2|^2)d(t)+v(t) \qquad (17)$$

We can thus see that the matched filter output in (12), using two transmit and one receive antenna, experiences the same diversity benefit as when using one transmit and two receive antennas[1]. This was shown by Alamouti [1, 2].

The received signals after complex conjugation of $r'_2(t)$ in the transmit diversity scheme for channel without intersymbol interference is shown in FIG. 3.

B. Channel with Intersymbol Interference

Let us now return to our original channel model in (2) with intersymbol interference. With the proper substitutions and manipulations we can derive the counterpart of the scheme by Alamouti [1, 2] for a channel with intersymbol interference. This derivation is however not trivial.

Assume that we transmit in such a way that the received signal has the form $$r(t) = H(q, q^{-1})d(t) + n(t), \qquad (18)$$

where $$H = \begin{bmatrix} h_1(q^{-1}) & h_2(q^{-1}) \\ h_2^*(q) & -h_1^*(q) \end{bmatrix}. \qquad (19)$$

The noise vector n(t) is the noise after the necessary manipulation in the receiver which will be explained below. It will be white with the covariance $R_{nn}=\sigma_n^2 I$. Note that the channels $h_2^*(q)$ and $h_1^*(q)$ have complex conjugated coefficients and are time reversed and thus anti-causal. We will see below how this signalling can be achieved.

The polynomial channel matrix $H(q, q^{-1})$ is also here orthogonal in the sense that $$H^H(q,q^{-1})H(q,q^{-1})=(h_1^*(q)h_1^*(q^{-1})+h_2^*(q)h_2^*(q^{-1}))I$$

In the receiver we now filter this signal with the matched filter $H^H(q, q^{-1})$. The output from the matched filter is then given by $$z(t) = H^H(q, q^{-1})H(q, q^{-1})d(t) + H^H(q, q^{-1})n(t) \qquad (20)$$
$$= (h_1^*(q)h_1(q^{-1}) + h_2^*(q)h_2(q^{-1}))d(t) + v(t),$$

where $$v(t) = \begin{bmatrix} v_1(t) \\ v_2(t) \end{bmatrix} = H^H(q, q^{-1})n(t). \qquad (21)$$

Using the components of $z(t)=[z_1(t) z_2(t)]^T$, we can express (20) as $$z_1(t)=(h_1^*(q)h_1(q^{-1})+h_2^*(q)h_2(q^{-1}))d_1(t)+v_1(t) \qquad (22)$$

$$z_2(t)=(h_1^*(q)h_1(q^{-1})+h_2^*(q)h_2(q^{-1}))d_2(t)+v_2(t) \qquad (23)$$

Similar to (16), the noise sequences $v_1(t)$ and $v_2(t)$ are uncorrelated as the spectrm[2] of v(t) given by $$R_{vv}(q, q^{-1}) = \sum_{m=-\infty}^{\infty} E[v(t)v^H(t-m)]q^{-m} \qquad (24)$$
$$= H^H(q, q^{-1})R_{nn}(q, q^{-1})H(q, q^{-1})$$
$$= \sigma_n^2 H^H(q, q^{-1})H(q, q^{-1})$$
$$= \sigma_n^2(h_1^*(q)h_1(q^{-1}) + h_2^*(q)h_2(q^{-1}))I$$

has no cross terms between $v_1(t)$ and $v_2(t)$. In the third equality we have used the fact that n(t) is a white vector noise sequence with $R_{nn}(q, q^{-1})=\sigma_n^2 I$.

The problem of detecting the symbol streams $d_1(t)$ and $d_2(t)$ thus decouples. Furthermore, the channel after matched filtering is the same as one would obtain when using one transmit antenna and two receive antennas. This scheme thus, similar to the case without intersymbol interference, obtains the same diversity benefit as one can achieve using one transmit and two receive antennas. It thus achieves full diversity. The intersymbol interference of course still has to be handled by an equalizer. The output from the matched filter is however exactly the signal to be processed by a maximum likelihood sequence estimator utilizing the matched filter metric. See for example [4, 3]. Again it should be noted that, as for the case without intersymbol interference, the gain from coherent combining obtained when using two receive antennas is not reproduced when using two transmit antennas and one receive antenna.

When using an MLSE, the estimated symbol sequence, $\hat{d}_1(t)$, will be the symbol sequence that maximizes the recursively defined matched filter metric [4, 3]

$$\mu_{MF}(t) = \mu_{MF}(t-1) + Re\left\{d_1^*(t)\left(2z_1(t) - \gamma_0 d_1(t) - 2\sum_{m=1}^{n\gamma}\gamma_m d_1(t-m)\right)\right\}. \quad (25)$$

In (25), $\gamma_k$ are the coefficients of the double sided complex conjugate symmetric metric polynomial $$\gamma(q,q^{-1}) = \gamma^*_{n\gamma}q^{n\gamma} + \ldots + \gamma_0 + \ldots + \gamma_{n\gamma}q^{-n\gamma} = h^*_1(q^{-1}) + h^*_2(q^{-1}) \quad (26)$$

Preferably, the maximizing sequence is found using the Viterbi algorithm[3] [5]. The estimated symbol sequence $\hat{d}_2(t)$ is similarly formed by maximizing the corresponding metric utilizing the second component, $z_2(t)$, of $z(t)$.

In order for the symbol detector in the receiver to work properly it has to be adapted to the channel. One way of doing this is to estimate the channel using the known transmitted symbols. This estimation of the channel can be performed in many different ways using well known methods. One method of estimating the channel is to estimate the polynomials $h_1(q^{-1})$ and $h_2(q^{-1})$ that best model the part of the received signal that correspond to the known transmitted symbols. This approach is well known and is only one of the examples of how channel estimation can be performed. In the symbol detector described here the maximum likelihood sequence detector using the metric in (25), one need to estimate the channel polynomials $h_1(q^{-1})$ and $h_2(q^{-1})$ and use them to form the metric polynomial in (26), whos coefficients are used in the maximum likelihood sequence detector metric in (25).

C. Anti-Causal Signalling

Consider the components $r_1(t)$ and $r_2(t)$ of the vector signal $r(t) = [r_1(t)\ r_2(t)]^T$:

$$r_1(t) = h_1(q^{-1})d_1(t) + h_2(q^{-1})d_2(t) + n_1(t) \quad (27)$$

$$r_2(t) = h^*_2(q)d_1(t) - h^*_1(q)d_2(t) + n_2(t) \quad (28)$$

To receive $r_1(t)$ we simply transmit the symbol stream $d_1(t)$ from antenna 11 and symbol stream $d_2(t)$ from antenna 12. However, since there is intersymbol interference in the channel we cannot transmit such as to receive $r_1(t)$ and $r_2(t)$ in alternating symbol intervals. We have to transmit such as to receive a longer sequence of $r_1(t)$, and a longer sequence of $r_2(t)$. We will describe this in more detail below.

Achieving $r_2(t)$ at the receiver is less straightforward but nonetheless possible. Consider the two symbol streams $d_1(t)$ and $d_2(t)$. Let us choose their length to be N+1. Time reverse these symbol streams to form the new symbol streams $$\tilde{d}_1(t) = d_1(N-t),\ t=0, 1, \ldots, N \quad (29)$$

$$\tilde{d}_2(t) = d_2(N-t),\ t=0, 1, \ldots, N \quad (30)$$

Now transmit $-\tilde{d}^*_2(t)$ from antenna 11 and $\tilde{d}^*_1(t)$ from antenna 12. The signal at the receiver will then be $$r'_2(t) = h_2(q^{-1})\tilde{d}^*_1(t) - h_1(q^{-1})\tilde{d}^*_2(t) + n(t) \quad (31)$$

By time reversing $r'_2(t)$ in (31) and complex conjugating it we obtain the signal $$(r'_2(N-t))^* = h^*_2(q)d_1(t) - h^*_1(q)d_2(t) + n_2(t) \quad (32)$$

where we have denoted $n^*(N-t)$ with $n_2(t)$. Note that the signal in (32) is is exactly the desired signal $r_2(t)$ in (28).

The received signal after manipulation in the transmit diversity scheme for channels with intersymbol interference is shown in FIG. 4.

The transmit diversity scheme can thus be summarized as follows. Divide a sequence of symbols, $d(t)$, $t=0, 1, \ldots, 2N+2$, into two sequences, $d_1(t)$, $t=0, 1, 2, \ldots, N$ and $d_2(t)$, $t=0, 1, 2, \ldots, N$. This division of the symbol sequence $d(t)$ into two symbol sequence can be made more or less arbitrary as long as there is an equal amount of symbols in each sequence $d_1(t)$ and $d_2(t)$ and the correlation between symbols in the sequences close to each other is not significantly effected. Also divide a transmission frame into two blocks. During the first block of the frame, transmit the sequence $d_1(t)$ from antenna one and the sequence $d_2(t)$ from antenna two. During the second block of the frame, transmit $d_2(t)$ time reversed and complex conjugated from antenna 11 and transmit $d_1(t)$ time reversed, complex conjugated and negated from antenna 12. The transmission procedure is depicted in FIG. 5.

Figure 6:
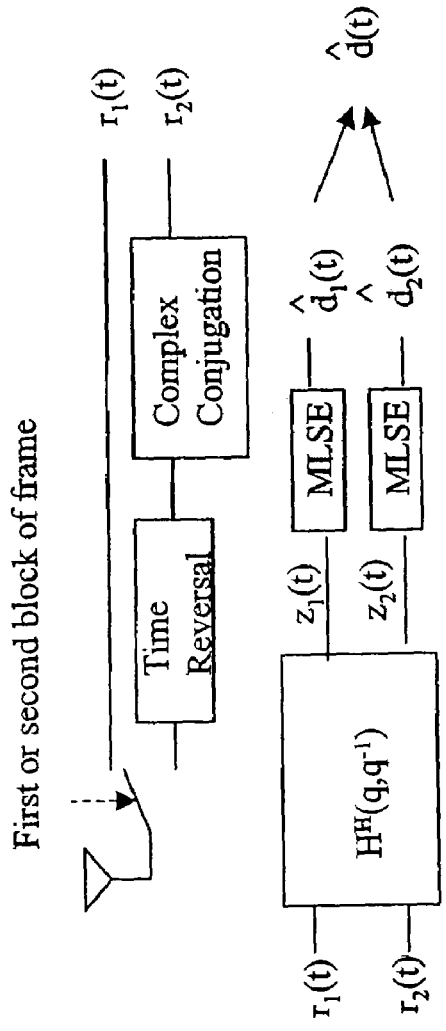
FIG. 6 is a schematic view of the symbol detection when using the transmit diversity scheme for channels with intersymbol interference.

On the receive side, during the first block of the frame, the samples are collected to form the sequence $r_1(t)$ and during the second block of the frame the samples are collected and the sequence is complex conjugated and time reversed in order to form the sequence $r_2(t)$. The sequences $r_1(t)$ and $r_2(t)$ are then fed into the MIMO matched filter $H^H(q, q^{-1})$ to form the decoupled outputs $z_1(t)$ and $z_2(t)$. The sequences $z_1(t)$ and $z_2(t)$ are then used independently to estimate the transmitted sequences $d_1(t)$ and $d_2(t)$. This detection can for example be performed with a maximum likelihood sequence estimator. The receive signal processing is schematically depicted in FIG. 6.

The way the symbols are transmitted and received, as described above, is a principal part of this invention. Especially important is the concept of time reversing the symbol streams when they are transmitted in the second block of the frame, and in the receiver time reversing the signal received during the second block of the frame. These time reversal operations is what enables the simple detection described in this invention. Without these time reversal operations, and the matched filtering described for the receiver, the detection of the two symbol streams, $d_1(t)$ and $d_2(t)$ does not decouple. There are many variations as to how the transmission and the reception can be arranged to achieve this effect. We can change which symbol sequence is being negated, which symbol streams are being complex conjugated and which symbol streams are being time reversed. Apart from changing the way in which the transmission is performed it will change the corresponding matched filter, $H^H(q, q^{-1})$, that is being applied in (20) in the receiver. All these are simple variations of this invention. The main principle is to arrange the transmission of the symbols in such a way that after they have passed through the channel and has been processed in the receiver as described in this invention, two outputs are produced that each depend only on one of the sequences, $d_1(t)$ or $d_2(t)$, and also is easy to equalize as described in this invention using, for example, a maximum likelihood sequence estimator.

A very important component of this invention is how to signal over a channel such that the effective experienced channel is a time-reversed version of the actual channel. We here describe the principle for how this can be achieved.

Assume that we have a time-discreted symbol stream d(t), t=1, 2, ..., N and a channel described by the polynomial $h(q^{-1})$. If we transmit the symbol stream d(t) over the channel $h(q^{-1})$, sampling the received signal once per symbol interval, the sampled output in the receiver, y(t), can be expressed as $$y(t)=h(q^{-1})d(t)+n(t) \quad (33)$$

where n(t) is a term representing noise plus interference. Let us now assume that we want to form a signal, ỹ(t), of the form $$\tilde{y}=(t) \, h(q)d(t)+v(t) \quad (34)$$

where v(t) is another representation of noise and interference and h(q) is a time reversed version of $h(q^{-1})$, i.e. the delay operators, $q^{-1}$, in $h(q^{-1})$ are replaced by the advance operator q. In other words, if $$h(q^{-1})=h_0+h_1q^{-1}+\ldots+h_{nh}q^{-nh} \quad (35)$$

then $$h(q)=h_0+h_1q+\ldots+h_{nh}q^{nh} \quad (36)$$

It is not trivial to signal with d(t) over $h(q^{-1})$ in such a way that ỹ(t) is generated but it can be done as follows.

Take the symbol stream d(t) and time-reverse it to form the time-reversed symbol stream $$\tilde{d}(t)=d(N+1-t), t=1, 2, \ldots, N \quad (37)$$

Transmit d̃(t) over the channel $h(q^{-1})$ such that the signal $$x(t)=h(q^{-1})\tilde{d}(t)+n'(t) \quad (38)$$

is received. Time reverse the signal x(t) giving the desired signal $$\tilde{y}(t)=x(N+1-t), t=1, 2, \ldots N \quad (39)$$

Because ỹ(t) is a time-reversed version of x(t) it can be expressed as in equation (34) and therefore is the signal we desire.

Due to the intersymbol interference the signalling suffers from some "edge effects". These can however be handled by insertion of known symbols in the beginning and end of each transmission block. Let us define the maximum delay in the channels as $$nh=^\Delta \max(nh_1, nh_2) \quad (40)$$

The first nh samples of $r_1(t)$ will thus not conform with (27) and similarly the last nh of $r_2(t)$ will not conform with (28). The matched filter in the receiver (20), filters $r_1(t)$ with $h^*_1(q)$ or $h^*_2(q)$ and $r_2(t)$ with $h_2(q^{-1})$ or $-h_1(q^{-1})$. As a result the matched filter signal, z(t), will only conform with (20) when t∈[nh+1, N−nh].

In the beginning and the end of each of the $r_1$- and $r_2$-blocks, nh symbols can thus not be used in the simplified detection outlined in this description. This is however not a big problem. We will in any case need some training symbols in order to estimate the channels $h_1(q^{-1})$ and $h_2(q^{-1})$. We can thus put these training symbols in the beginning and the end of each of the $r_1$- and $r_2$-blocks, or more precisely, in the beginning and the end of the sequences $d_1(t)$ and $d_2(t)$, and thus also in the beginning and end of the sequences $-d^*_2(N-t)$ and $d^*_1(N-t)$. The training symbols at the end of the $r_1$-block and at the beginning of the $r_2$-block can always be combined to a longer training sequence. This is important since when estimating channels with intersymbol interference, the training sequence cannot be allowed to be too short. Further, extra training symbols can be inserted in between the end of the $r_1$-block and before the beginning of the $r_2$-block.

Also, if this scheme is used in the transmission from a base station, then the receiving subscriber can potentially combine the training symbols at the end of an $r_2$-block with the beginning of an $r_1$-block to form yet another longer training sequence.

Figure 7:
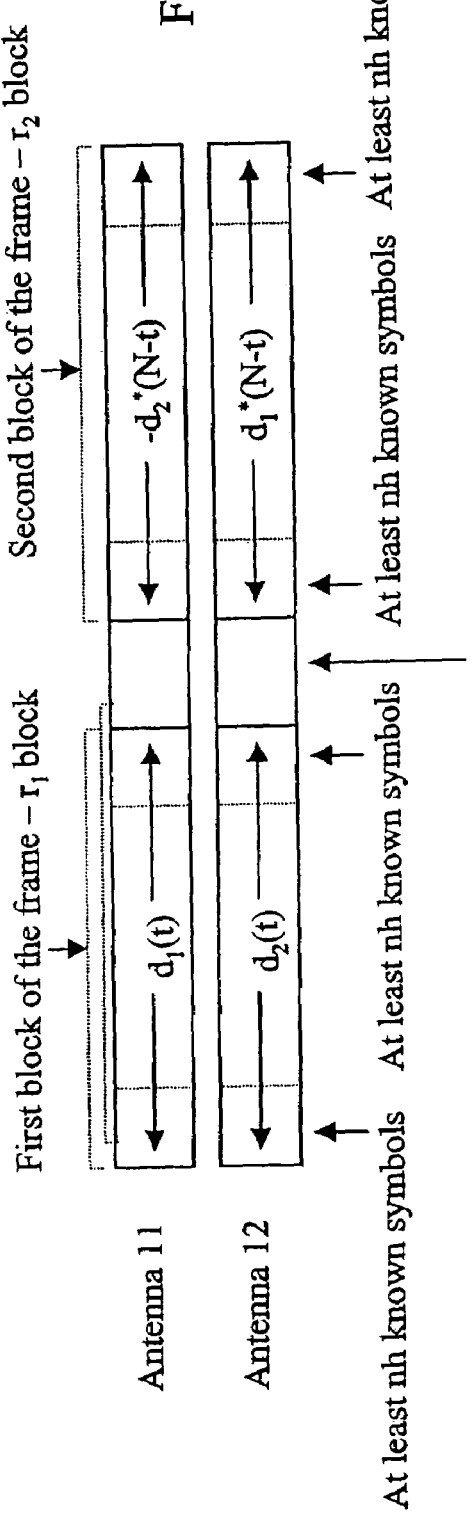
FIG. 7 illustrates the configuration of the training data and data transmitted by the antennas.

Note that all symbols, including the training symbols, transmitted in the $r_2$-block are time reversed compared to the corresponding symbols in the $r_1$-block. The training sequences in the $r_2$-block are thus time reversed compared to the the training sequences in the $r_1$-block. The number of training symbols in the beginning and the end of the sequences $d_1(t)$ and $d_2(t)$ has to be at least equal to the maximum expected delay, nh, in symbol periods. FIG. 7 shows the configuration of training data and data. The upper row of data is transmitted from antenna 11 and the lower row is transmitted from antenna 12.

I. Combining With Transmit Delay Diversity

We will here call the method of transmit diversity described above 'time-reversal space-time block coding'. Since time-reversal space-time block coding can handle intersymbol interferference, we can combine it with the well known method of transmit delay diversity [6]. In transmit delay diversity artificial delay spread is introduced in the channel by transmitting the same signal from two or more antennas with some delay between the transmissions from the different antennas. The delay between the antenns would typically be of the order of a symbol interval. This artificially introduced delay spread in the channel introduces diversity that can be exploited by the equalizer or sequence detector in the receiver. We can now combine transmit delay diversity with time-reversal space-time block coding as follows.

Let us divide a group of transmit antennas into two groups. Within the respective groups we use transmit delay diversity. We then view the two groups as two different channels and apply time-reversal space-time block coding to them. We thereby double the initial diversity that the transmit delay diversity achieved within each group. With more diversity the received signal level will vary even less and even less received power is required at the subscriber unit. This can be used to further increase the range of the system or further increase the capacity as less power can be transmitted from the base station, thus creating less interference and thus allowing more users in the system.

The combination of time-reversal space-time block coding with transmit delay diversity is a part of this invention.

A new transmit diversity scheme for channels with intersymbol interference, causing intersymbol interference, has been described. The intersymbol interference can be caused by partial response modulation or by delay spread in the propagation channel. This scheme shares many of the benefits of the transmit diversity scheme for channels without intersymbol interference presented in [1, 2]. It can however, as opposed to the scheme described in [1, 2] handle channels with intersymbol interferense efficiently. This is very important as most practical wireless communication channels have some intersymbol interference from either partial response modulation in the transmitter or from delay spread in the propagation channel or from filtering in the receiver, or from all of these effects.

The detection of the symbol streams are decoupled, avoiding an unnecessarily complex detector. The scheme also achieves the same diversity benefit with two transmit antennas and one receive antenna as can be achieved with one transmit antenna and two receive antennas. The channel is required to be approximately stationary over a block of symbols. The size of this block is a design parameter.

Note that this scheme can be particularly useful in order to achieve transmit diversity when signalling with higher order constellations (e.g. QAM, 8PSK or 16QAM) as the complexity of the equalizer is not increased. If we attempt to achieve the same diversity by employing transmit delay diversity, then the equalizer may become substantially more complex. This especially applies if the receiver uses an MLSE or a suboptimal version thereof.

Since the method described above, which we here call time-reversal space-time block coding, can handle intersymbol interferference, we can combine it with the well known method of transmit delay diversity [6]. We can divide a group of transmit antennas into two groups. Within the respective groups we can use transmit delay diversity. We then view the two groups as two different channels and apply time-reversal space-time block coding to them. We thereby double the initial diversity that the transmit delay diversity achieved within each group.

Both the time-reversal space-time block coding alone and the combination with transmit delay diversity increases the diversity in the transmission. This means that the receiver sees more, somewhat independenatly, fading signals and the probabillity that they all will have low power at the same time is reduced. With more diversity the received signal level will vary even less and even less received power is required at the subscriber unit. This can be used to increase the range of the system or increase the capacity as less power can be transmitted from the base station, thus creating less interference and thus allowing more users in the system. The so called fading margin in the transmission can then be reduced. This means that a lower mean power is required at the subscriber unit. This lower required mean power can either be used to increase the range of the transmission by keeping the transmitted power unchanged or increase the capacity of system by lowering the transmitted power and thereby reducing the interference such that more users can be allowed into the system. The lower required mean power can also be used to increase the data rate to the subscriber if different data rates are available.

The above described embodiments of the invention are, obviously, merely illustrative implementations of the principles of the invention and various modifications and enhancements can be introduced by artisans without departing from the spirit and scope of this invention, which is embodied in the following claims.

REFERENCES

[1] S. M. Alamouti, "A simple transmit diversity technique for wireless communications," *Journal of Selective Areas of Communications*, vol. 16, no. 8, pp. 1451-1458, October 1998.

[2] S. M. Alamouti, "Transmitter diversity technique for wireless communications,", International patent application PCT/US98/17963.

[3] E. Lindskog. *Space-time processing and equalization for wireless communications*, PhD thesis, Uppsala University, Signals and Systems, PO Box 528, 751 20 Uppsala, Sweden, 1999, See www.signal.uu.se.

[4] E. Lindskog, "Multi-channel maximum likelihood sequence estimation," in *Proceedings of the 47th IEEE Vehicular Technology Conference*, vol. 2, Phoenix, Arizona, USA, May 5-7 1997, pp. 715-719.

[5] A. J. Viterbi, "Error bounds for convolutional codes and an asymptotically optimum decoding algorithm," *IEEE Transactions on Information Theory*, vol. 13, pp. 260-269, April 1967.

[6] A. Wittneben, "Base station modulation diversity for digital simulcast," in *Proceedings of the 41st Vehicular Technology Conference*, 1991.

What is claimed is:

1. A method of transmitting a signal having a sequence of symbols through at least one channel with intersymbol interference, comprising the steps of:
   dividing the sequence of symbols to form a plurality of symbol streams; and
   processing the plurality of symbol streams before transmitting each symbol stream through a channel,
   wherein processing the plurality of symbol streams comprises time-reversing at least one of the symbol streams and complex conjugating at least one of the symbol streams to generate at least one time-reversed processed symbol stream before transmitting the at least one time-reversed processed symbol stream.

2. The method of claim 1 wherein processing the plurality of symbols streams further comprises complex conjugating at least one of the symbol streams to generate at least one complex-conjugated processed symbol stream before transmitting the at least one complex-conjugated processed symbol stream.

3. The method of claim 2, further comprising the step of transmitting the at least one complex-conjugated processed symbol stream after said processing.

4. The method of claim 1, further comprising the step of transmitting the at least one time-reversed processed symbol stream after said processing.

5. The method of claim 1, wherein the time-reversing at least one of the symbol streams and complex conjugating at least one of the symbol streams comprises one of: (a) time-reversing and complex-conjugating the same symbol stream to generate the at least one processed symbol stream that is time-reversed and complex conjugated, and (b) time-reversing and complex conjugating different symbol streams to generate different symbol streams including the at least one processed symbol stream that is time-reversed and the at least one processed symbol stream that is complex conjugated.

6. A method for receiving and processing signals transmitted from a transmitter to a receiver, comprising the steps of:
   receiving a first symbol stream in a first block of a frame;
   receiving a second symbol stream in a second block of the frame;
   generating a time-reversed and complex conjugated form of the second symbol stream from the second symbol stream received in the second block of the frame; and
   filtering the first symbol stream in the first block and the time reversed and complex conjugate form of the second symbol stream to generate at least first and second decoupled output symbol streams.

7. The method of claim 6 where each of the first and second symbol streams is received by multiple antennas and is combined in order to increase signal quality and reduce interference.

8. The method in claim 6, wherein said at least one time-reversed version of the symbol stream used for filtering is representative of the symbol stream rather than of a channel.

9. The method in claim 6, wherein the decoupled output symbol streams are decoupled in that: (i) the first decoupled output symbol stream depends on the first symbol stream and not on the second symbol stream; and (ii) the second decoupled output symbol stream depends on the second symbol stream and not on the first symbol stream.

10. The method in claim 9, wherein the first and second decoupled outputs may are further processed to equalize intersymbol interference in the first and second decoupled outputs to detect the transmitted first and second symbol streams by at least one of: (i) maximum likelihood sequence estimation, linear equalization, (iii) decision feedback equalization, and (iv) combinations of these.

11. A method for receiving and processing signals transmitted from a transmitter to a receiver, comprising the steps of:

receiving a first symbol stream in a first block of a frame;

receiving a second symbol stream in a second block of the frame;

time reversing and taking the complex conjugate form of the second symbol stream in the second block; and filtering the first symbol stream in the first block and the time reversed and complex conjugate form of the second symbol stream to form decoupled outputs;

the first and second symbol streams each comprises first and second portions, the first portion of the first symbol stream depending on a first symbol sequence $d_1(t)$ and a second portion of the first symbol stream depending on a second symbol sequence $d_2(t)$, the first portion of the second symbol stream depending on $d_2(t)$, the second portion of the second symbol stream depending on $d_1(t)$, and the step of filtering further comprises filtering the first symbol stream and the time reversed complex conjugate of the second symbol stream in the second block using a matched filter according to $$\begin{bmatrix} z_1(t) \\ z_2(t) \end{bmatrix} = \begin{bmatrix} h_1^*(q) & h_2(q^{-1}) \\ h_2^*(q) & -h_1(q^{-1}) \end{bmatrix} \begin{bmatrix} r_1(t) \\ r_2(t) \end{bmatrix}$$

wherein $r_1(t)$ is the first symbol stream and $r_2(t)$ is the time reversed complex conjugate of the second symbol stream, $z_1(t)$ and $z_2(t)$ are the decoupled outputs, $h_1(q^{-1})$ is a polynomial in a unit delay operator $q^{-1}$, describing a first channel from which the first portion of the first symbol stream is received, $h_2(q^{-1})$ is a polynomial in the unit delay operator $q^{-1}$, describing a second channel from which the second portion of the first symbol stream is received, $h_{1}^{*}(q)$ and $h_{2}^{*}(q)$ are polynomials in a unit advance operator q representing effective channels from which the first and second portions of the second symbol stream are received, respectively, outputs $z_1(t)$ and $z_2(t)$ being decoupled in that $z_1(t)$ depends on the first symbol stream $d_1(t)$ and not on the second symbol stream $d_2(t)$, and $z_2(t)$ depends on the second symbol stream $d_2(t)$ and not on the first symbol stream $d_1(t)$.

12. The method of claim 11, further comprising the step of:

after the step of filtering, estimating the symbol stream $d_1(t)$ from output $z_1(t)$ and symbol stream $d_2(t)$ from output $z_2(t)$.

13. The method in claim 11 wherein the first and second symbol streams comprise known symbols, the method further comprising estimating the first and the second channels using the known symbols.

14. A system for receiving and processing data comprising:

at least one antenna adapted to receive a first symbol stream in a first block of a frame and a second symbol stream in a second block of the frame, each symbol stream comprising a plurality of symbols;

a combining filter coupled to the antenna and adapted for generating a time-reversed and complex conjugated form of the second symbol stream from the second symbol stream received in the second block of the frame; and a matched filter coupled to the combining filter and adapted to generate decoupled first and second outputs from the filtering of the first symbol stream and the time reversed and complex conjugate form of the second symbol stream.

15. The system of claim 14 further comprising an equalizer adapted to resolve intersymbol interference in the first and second blocks.

16. The system of claim 14 wherein the first and second symbol streams each comprises first and second portions, the first portion of the first symbol stream depending on a first symbol sequence $d_1(t)$ and a second portion of the first symbol stream depending on a second symbol sequence $d_2(t)$, the first portion of the second symbol stream depending on $d_2(t)$, the second portion of the second symbol stream depending on $d_1(t)$, and the matched filter forms the decoupled first and second outputs according to $$\begin{bmatrix} z_1(t) \\ z_2(t) \end{bmatrix} = \begin{bmatrix} h_1^*(q) & h_2(q^{-1}) \\ h_2^*(q) & -h_1(q^{-1}) \end{bmatrix} \begin{bmatrix} r_1(t) \\ r_2(t) \end{bmatrix}$$

wherein $r_1(t)$ is the first symbol stream and $r_2(t)$ is the time reversed complex conjugate of the second symbol stream, $z_1(t)$ and $z_2(t)$ are the decoupled first and second outputs, respectively, $h_1(q^{-1})$ is a polynomial in a unit delay operator $q^{-1}$, describing a first channel from which the first portion of the first symbol stream is received, $h_2(q^{-1})$ is a polynomial in the unit delay operator $q^{-1}$, describing a second channel from which the second portion of the first symbol stream is received, $h_1^*(q)$ and $h_2^*(q)$ are polynomials in a unit advance operator q representing effective channels from which the first and second portions of the second symbol streams are received, respectively outputs $z_1(t)$ and $z_2(t)$ are decoupled in that $z_1(t)$ depends on the first symbol stream $d_1(t)$ and not on the second symbol stream $d_2(t)$, and $z_2(t)$ depends on $d_2(t)$ and not on $d_1(t)$.

17. The system of claim 16 further comprising:

an estimator adapted to estimating the first symbol stream $d_1(t)$ and the second symbol stream $d_2(t)$ from the decoupled outputs $z_1(t)$ and $z_2(t)$, respectively.

18. The system of claim 17 further comprising an equalizer adapted to resolve intersymbol interference in the first and second blocks.

19. The system of claim 16 wherein the first and second symbol streams comprise known symbols, the system further comprising a channel estimator adapted to estimate the first and the second channels using the known symbols.

20. The system of claim 14 wherein each of the first and second symbol streams is received by multiple antennas and is combined in order to increase signal quality and reduce interference.

21. The system in claim 14, wherein said at least one time-reversed version of the symbol stream used for filtering is representative of the symbol stream rather than of a channel.

22. The system in claim 14, wherein the decoupled output symbol streams are decoupled in that: (i) the first decoupled output symbol stream depends on the first symbol stream and not on the second symbol stream; and (ii) the second decoupled output symbol stream depends on the second symbol stream and not on the first symbol stream.

23. The system in claim 22, wherein the first and second decoupled outputs may are further processed to equalize intersymbol interference in the first and second decoupled outputs to detect the transmitted first and second symbol streams by at least one of: (i) maximum likelihood sequence estimation, linear equalization, (iii) decision feedback equalization, and (iv) combinations of these.

24. A method for receiving and processing signals transmitted from a transmitter to a receiver, the method comprising:
receiving a plurality of received symbol sequences each comprising symbols from a plurality of transmitter symbol streams, and
processing the received symbol sequences to generate decoupled outputs each for separately detecting a different one of the transmitter symbol streams, wherein processing the received symbol sequences comprises: (i) time reversing at least one of the received symbol sequences after receiving it to generate at least one time reversed receiver symbol sequence, and (ii) complex conjugating at least one of the symbol sequences, and filtering at least one symbol sequence in its received form and at least one symbol sequence in a time-reversed and complex conjugated form to generate the decoupled outputs.

25. The method in claim 24, wherein the plurality of received symbol sequences includes a first and a second received symbol sequence, and the decoupled outputs are decoupled in that: (i) the first decoupled output depends only on a first symbol sequence and not on the second symbol sequence; and (ii) the second decoupled output symbol sequence depends only on the second symbol sequence and not on the first symbol sequence.

26. A method for receiving and processing signals transmitted from a transmitter to a receiver, the method comprising:
receiving a plurality of received symbol sequences each comprising symbols from a plurality of transmitter symbol streams, the plurality of symbol sequences are received from one or more channels and comprise known symbols;
processing the received symbol sequences to generate decoupled outputs each for separately detecting a different one of the transmitter symbol streams, wherein processing the received symbol sequences comprises time reversing at least one of the received symbol sequences after receiving and complex conjugating at least one of the received symbol sequences after receiving to generate at least one time reversed receiver symbol sequence and at least one complex conjugated symbol sequence; and
estimating the one or more channels using the known symbols.

27. The method of claim 26, wherein the at least one time reversed receiver symbol sequence and the at least one complex conjugated symbol sequence are the same symbol sequence.

28. The method of claim 26, wherein the at least one time reversed receiver symbol sequence and the at least one complex conjugated symbol sequence are the different symbol sequences.

29. An apparatus for receiving and processing signals transmitted from a transmitter, the apparatus comprising:
means for receiving a plurality of symbol sequences, each symbol sequence comprising symbols from a plurality of symbol streams; and
means for processing the received symbol sequences at the same time to simultaneously generate decoupled outputs each for separately detecting a different one of the symbol streams and each decoupled output depending only on a different one of the symbol streams, wherein the means for processing the received symbol sequences comprises means for time reversing at least one of the symbol sequences and means for forming complex-conjugated forms of at least one of the symbol sequences, the means for time-reversing and the means for forming complex-conjugated forms operating at the same time to generate decoupled outputs.

30. An apparatus for receiving and processing signals transmitted from a transmitter, the apparatus comprising:
means for receiving a plurality of symbol sequences, each symbol sequence comprising symbols from a plurality of symbol streams; and
means for processing the received symbol sequences to generate decoupled outputs each for separately detecting a different one of the symbol streams, wherein the means for processing the received symbol sequences comprises means for time reversing at least one of the symbol sequences and means for forming complex-conjugated forms of at least one of the symbol sequences; and
wherein the means for processing the received symbol sequences further comprises means for filtering at least one symbol sequence in its received form and at least one symbol sequence in a time-reversed and complex conjugated form to generate the decoupled outputs, each decoupled output depending on a different one of the symbol streams.

31. An apparatus for receiving and processing signals transmitted from a transmitter, comprising:
means for receiving a plurality of symbol sequences, each symbol sequence comprising symbols from a plurality of symbol streams; and
means for processing the received symbol sequences to generate decoupled outputs each for separately detecting a different one of the symbol streams, wherein the means for processing the received symbol sequences comprises means for time reversing at least one of the symbol sequences and means for complex conjugating at least one of the symbol sequences;
the means for receiving a plurality of symbol includes means for receiving a first and a second received symbol sequence; and
the means for processing includes means for processing the decoupled outputs so that they are decoupled in that: (i) the first decoupled output depends only on a first symbol sequence and not on the second symbol sequence; and (ii) the second decoupled output symbol sequence depends only on the second symbol sequence and not on the first symbol sequence.

32. The method of claim 31, wherein the means for processing the received symbol sequences comprises means for time reversing at least one of the symbol sequences and means for complex conjugating at least one of the symbol sequences comprises one of: (a) means for time-reversing and complex conjugating the same symbol sequence to generate the at least on processed symbol sequence that is time-reversed and complex conjugated, and (b) means for time-reversing and complex conjugating different symbol sequences to generate different symbol sequences including the at least one processed symbol sequence that is time-reversed and the at least one processed symbol sequence that is complex conjugated.

33. A system for receiving and processing data comprising:
at least one antenna adapted to receive a first symbol stream in a first block of a frame and a second symbol stream in a second block of the frame, each symbol stream comprising a plurality of symbols;
a combining filter coupled to the antenna and adapted for time reversing and taking the complex conjugate of the second symbol stream received in the second block; and
a matched filter coupled to the combining filter and adapted to form decoupled first and second outputs from the first symbol stream and the time reversed and complex conjugate form of the second symbol stream;
the first and second symbol streams each comprises first and second portions, the first portion of the first symbol stream depending on a first symbol sequence $d_1(t)$ and a second portion of the first symbol stream depending on a second symbol sequence $d_2(t)$, the first portion of the second symbol stream depending on $d_2(t)$, the second portion of the second symbol stream depending on $d_1(t)$, and the matched filter forms the decoupled first and second outputs according to $$\begin{bmatrix} z_1(t) \\ z_2(t) \end{bmatrix} = \begin{bmatrix} h_1^*(q) & h_2(q^{-1}) \\ h_2^*(q) & -h_1(q^{-1}) \end{bmatrix} \begin{bmatrix} r_1(t) \\ r_2(t) \end{bmatrix}$$

wherein $r_1(t)$ is the first symbol stream and $r_2(t)$ is the time reversed complex conjugate of the second symbol stream, $z_1(t)$ and $z_2(t)$ are the decoupled first and second outputs, respectively, $h_1(q^{-1})$ is a polynomial in a unit delay operator $q^{-1}$, describing a first channel from which the first portion of the first symbol stream is received, $h_2(q^{-1})$ is a polynomial in the unit delay operator $q^{-1}$, describing a second channel from which the second portion of the first symbol stream is received, $h_1^*(q)$ and $h_2^*(q)$ are polynomials in a unit advance operator $q$ representing effective channels from which the first and second portions of the second symbol streams are received, respectively, outputs $z_1(t)$ and $z_2(t)$ are decoupled in that $z_1(t)$ depends on the first symbol stream $d_1(t)$ and not on the second symbol stream $d_2(t)$, and $z_2(t)$ depends on $d_2(t)$ and not on $d_1(t)$.

34. An apparatus for receiving and processing signals transmitted from an external transmitter, the apparatus comprising:

means for receiving a plurality of symbol sequences, each symbol sequence comprising symbols from a plurality of symbol streams; and
means for processing the received symbol sequences at the same time to simultaneously generate decoupled outputs each for separately detecting a different one of the symbol streams and each decoupled output depending only on a different one of the symbol streams, wherein the means for processing the received symbol sequences comprises at least one of:
means for time reversing at least one of the symbol sequences;
means for complex-conjugating at least one of the symbol sequences;
means for negating at least one of the symbol sequences; and
means for maintaining the original form of at least one of the symbol sequences; and
the processing applied by the means for processing to the different symbol streams are applied at the same time and are not the same processing and generate the decoupled outputs.

35. An apparatus as in claim 34, wherein the means for processing includes the means for time reversing at least one of the symbol sequences and means for complex-conjugating at least one of the symbol sequences, and the processing includes simultaneously time-reversing one of the symbol streams and complex conjugating the other of the symbol streams.

36. An apparatus as in claim 34, wherein the means for processing includes the means for time reversing at least one of the symbol sequences and the means for negating at least one of the symbol sequences, and the processing includes simultaneously time-reversing one of the symbol streams and negating the other of the symbol streams.

37. An apparatus as in claim 34, wherein the means for processing includes the means for time reversing at least one of the symbol sequences, the means for complex-conjugating at least one of the symbol sequences and means for negating at least one of the symbol sequences, and the processing includes simultaneously time-reversing one of the symbol streams, complex-conjugating one of the symbol streams, and negating the one of the symbol streams.

38. An apparatus as in claim 34, wherein the means for processing includes the means for time reversing at least one of the symbol sequences and means for maintaining the original form of at least one of the symbol sequences, and the processing includes simultaneously time-reversing one of the symbol streams and maintaining the original form of the other of the symbol streams.

39. An apparatus as in claim 34, wherein the means for processing includes at least two means selected from the set: (i) means for time reversing at least one of the symbol sequences, (ii) means for complex-conjugating at least one of the symbol sequences; (iii) means for negating at least one of the symbol sequences, and (iv) means for maintaining the original form of at least one of the symbol sequences; and
the processing applied by the means for processing includes different processing by the at least two means applied to different ones of the symbol streams at the same time and generate the decoupled outputs.

40. An apparatus as in claim 39, wherein the means for processing includes at least three of the: (i) means for time reversing at least one of the symbol sequences, (ii) means for complex-conjugating at least one of the symbol sequences;

(iii) means for negating at least one of the symbol sequences, and (iv) means for maintaining the original form of at least one of the symbol sequences; and the processing applied by the means for processing includes different processing by the at least three means applied to different ones of the symbol streams at the same time and generate the decoupled outputs.

41. An apparatus as in claim 40, wherein the different symbol streams are processed together in combination using filtering and maximum likelihood sequence estimation to generate outputs that are estimates of symbols transmitted from the external transmitter.

* * * * *